J. C. CONN.
BELT FASTENER.
APPLICATION FILED NOV. 7, 1911.
1,125,477.
Patented Jan. 19, 1915.
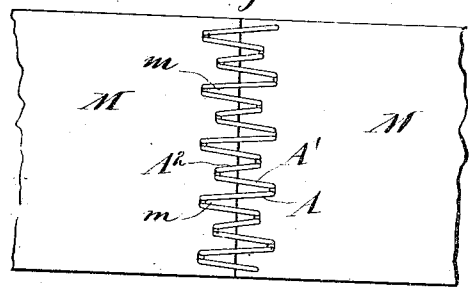
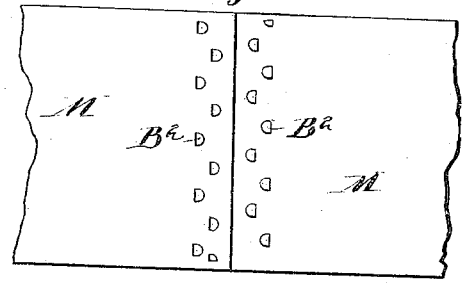
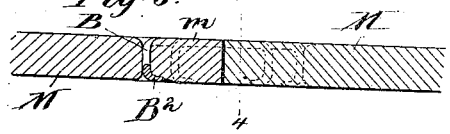
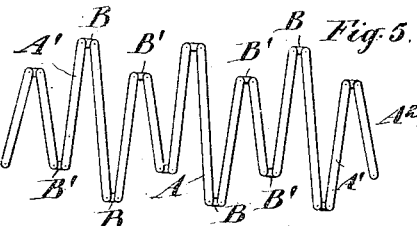
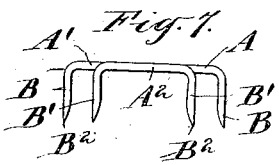
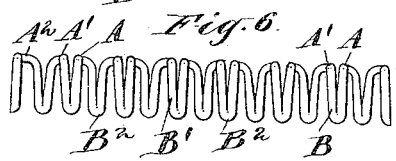
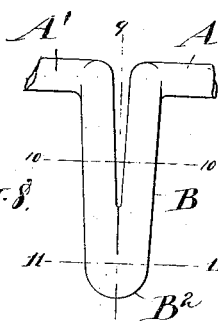
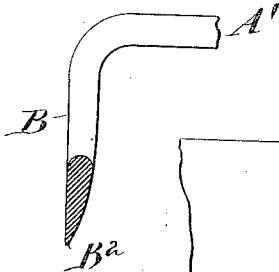
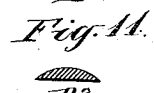
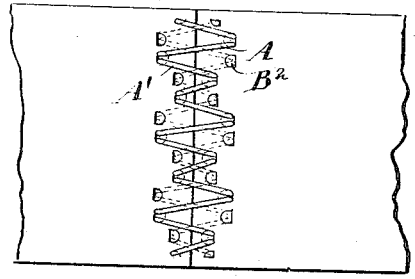
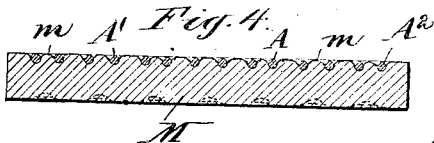
Witnesses:
C. M. Frederick
L. H. Wilshusen
Inventor:
Joseph C. Conn,
by his attorney,
Charles R. Searle

UNITED STATES PATENT OFFICE.

JOSEPH C. CONN, OF BOONTON, NEW JERSEY.

BELT-FASTENER.

1,125,477. Specification of Letters Patent. Patented Jan. 19, 1915.

Application filed November 7, 1911. Serial No. 658,998.

*To all whom it may concern:*

Be it known that I, JOSEPH C. CONN, a citizen of the United States, residing at Boonton, in the county of Morris and State of New Jersey, have invented certain new and useful Improvements in Belt-Fasteners, of which the following is a specification.

The invention relates to fastening means for joining the ends of power belts.

Fasteners cut or stamped from sheet metal in serpentine form having the angular ends of the opposite convolutions bent to serve as points or spurs to engage the margins of the abutting belt-ends have been long and favorably known but have several objectionable features.

The object of my invention is to provide a fastener of this type, formed from a continuous length of wire. The fastener thus produced offers the advantages of easy application, an increased grasp on the belt-ends, great tensile strength and a considerable reduction in initial cost of manufacture, with an additional saving through the avoidance of waste in production.

The improved fastener is designed to be made by automatic machinery in continuous lengths and subsequently cut off as required, without waste, in sections corresponding to the widths of belts to be joined.

The invention consists in certain novel features of construction and arrangement by which the above objects and advantages are attained, to be hereinafter described and pointed out in the claims.

The accompanying drawings form a part of this specification and show the invention as it has been carried out in practice.

Figure 1 is a face view of an abutting pair of belt-ends joined by the improved fastener. Fig. 2 is a similar view of the opposite face. Fig. 3 is a corresponding section, on a larger scale, taken longitudinally of the belt. Fig. 4 is a transverse section on the line 4—4 in the preceding figure. Fig. 5 is a face or plain view of the fastener alone. Fig. 6 is a corresponding front elevation. Fig. 7 is an end view of the same. Fig. 8 is a front view of one of the spurs on a greatly enlarged scale. Fig. 9 is a corresponding vertical section, on the line 9—9 in Fig. 8. Figs. 10 and 11 are cross-sections on the lines 10—10 and 11—11 respectively, in Fig. 8. Fig. 12 is a face view corresponding to Fig. 1, showing two fasteners introduced from opposite faces of the belt-ends.

Similar letters of reference indicate corresponding parts in all the figures.

The fastener comprises a series of angular serpentine bends of a continuous wire in a single plane, with the bights or angles at each side treated to form pointed spurs and bent downwardly at an approximate right angle to such plane.

In the preferred form shown, the members A, $A^1$, and $A^2$ forming the body portion lie in the same plane and are of different lengths to produce two series of spurs B and $B^1$ on each side of the body, which are engaged in two rows in the margin of each belt-end M on opposite sides of and parallel with the abutting line or joint. The points of engagement are thus staggered and the weakening effect of a single line avoided.

The angles or bights of the wire forming the spurs B $B^1$ are treated by suitable dies or otherwise to produce a cutting point $B^2$ of rounded contour having the outer face practically flat and the inner face curved upwardly from the cutting edge to the full thickness of the wire, and of convex section horizontally, as shown in Figs. 8, 9, 10 and 11.

In applying the fastener the spurs B $B^1$ are driven through the belt-ends, preferably into a piece of leather or other yielding material, and the body portion composed of the members A, $A^1$, $A^2$ sunk or embedded in the outer belt surfaces, the belt-ends are then reversed and the projecting points $B^2$ bent over toward the joint and embedded in the inner surfaces, thus strongly joining the belt-ends together.

In the driving operation the curved bevel and convex contour of the inner faces of the spurs tend to draw the belt-ends toward each other into close abutment, and also to crowd the V-shaped ridge $m$ of the material of the belt, forced up between the adjacent embedded members A, $A^1$, $A^2$, into the angle formed by such members, thus increasing the grasp of the fastener upon the belt-ends.

By embedding the members A, $A^1$, $A^2$ and the points $B^2$ of the spurs B, $B^1$ in the belt material, direct contact of the metal of the fastener with the pulley is reduced or avoided and the grip of the belt upon the pulley is unimpaired and uniform. The joint thus formed is eminently efficient.

The fastener is light and strong, well adapted to resist the tensile strains to which it is subjected in service, is easily applied, and by sinking the body portion and spur points into the belt surfaces the engagement with the belt-ends is greatly strengthened. The serpentine bends permit a degree of lateral elasticity or width-variation of the belt, and also allows the joint to flex in conforming to the crown or convexity of the pulley surface without weakening the engagement.

Economical manufacture is attained by producing the fasteners in continuous lengths by suitable automatic machinery without waste; and by cutting off the desired length by dividing on the line passing through a spur, the user is able to avoid waste in applying the fastener, each divided spur serving as an engaging point.

Cylindrical wire is preferred for reasons of economy and because it may be readily embedded in the belt, but wire of other section may be employed.

Although the spurs are preferably staggered as shown, they may be formed in a single row on each side; in such case the angles of the body members may be increased to widen the space between the spurs, as indicated in Fig. 12 in which such widening is provided for the purpose of permitting a fastener to be driven from each surface of the belt without materially weakening the latter in providing the double fastener strength desired.

It will be noticed that the wire is so embedded in the material of the belt that the substantially V-shaped portions of the belt between each two adjacent diagonal members of the body portion serve to resist strain in both longitudinal and lateral directions, so that lateral distortion of the belt, pulling out of the spurs and cutting of the belt by said spurs is prevented. These V-shaped portions of the belt between adjacent diagonal members extend upon opposite sides of the abutting line of the belt ends, which tends to better resist longitudinal strains.

Although the invention has been described as designed for the purpose of joining and repairing belts, it will be understood that it may be employed for other purposes and uses to which it may be adapted.

The fastener constructed as hereinbefore described is readily extensible or compressible to accommodate it for use on belt ends according to the use to which the latter is to be put. For instance, if it be desired to apply the fastener to the ends of a belt that is to be used under heavy tension and, consequently, greater strain, the V-shaped portions may be readily compressed or forced inward toward each other so as to not only bring the driving points closer together transversely of the length of the belt, but also spread them farther apart in the longitudinal direction of the belt, thereby increasing the number of grips in a given width of belt, as well as extending the driving points farther away from the abutting ends of the belt. This feature is especially serviceable in connection with fabric belts. On the other hand, when the fastener is to be applied to a belt to be employed under light tension or strain, the fastener can be readily extended in the direction of its length after the manner of an accordion so as to spread the driving points so as to employ a less number in a given width of belt and said driving points will also be brought nearer to the abutting ends of the belt which is a decided advantage when the belt is to travel over a small pulley.

I claim:—

1. As an improved article of manufacture, a belt fastener sufficiently stiff to be driven through an ordinary belt and composed of a single continuous length of wire formed into a series of angular yieldable bends and having a body portion and sharpened spurs, said body portion composed of diagonal members lying in a single plane and said spurs formed by bending the angular bights at each side of said body portion at substantially a right angle to such plane and sharpened to form driving points each of double wire, the said fastener being endwise extensible and compressible.

2. A belt-fastener comprising a plurality of zigzag arranged staple-like portions with the adjacent legs of the staple-like portions substantially parallel and their ends united and sharpened to form prongs sufficiently stiff and sharp to be driven through an ordinary belt.

3. A belt-fastener strip comprising throughout substantially parallel rows of clenchable driving prongs with connecting portions integral therewith, each prong consisting of two substantially parallel strands joined at the end of the prong and said end being sharpened, whereby said prongs are stiff and sharp enough for driving and said strip is adapted to be manually severed at any prong-end to produce a belt-fastener or fasteners of desired length as required for use.

In testimony that I claim the invention above set forth I affix my signature, in presence of two witnesses.

JOSEPH C. CONN.

Witnesses:
 W. C. SALMON,
 ADAM FISHER.

Copies of this patent may be obtained for five cents each, by addressing the "Commissioner of Patents, Washington, D. C."